Nov. 5, 1968   R. J. GELIN   3,409,222
METHOD AND APPARATUS FOR MIXING AND SPRAYING TWO DIFFERENT
LIQUIDS AND MEANS FOR FLUSHING AFTER USE
Filed Dec. 21, 1965   2 Sheets-Sheet 2

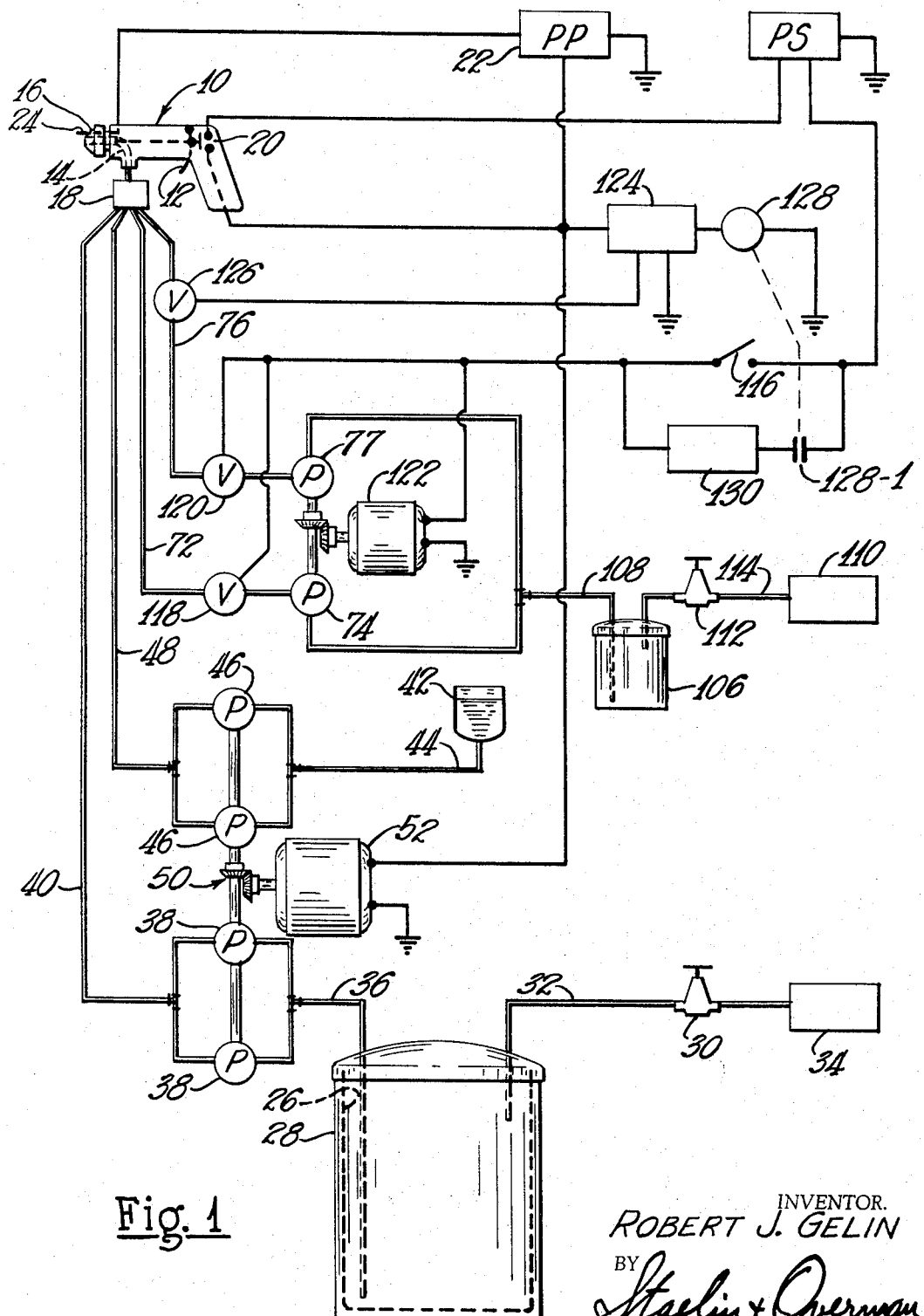

INVENTOR.
ROBERT J. GELIN
BY
Staelin & Overman
ATTORNEYS

United States Patent Office 3,409,222
Patented Nov. 5, 1968

3,409,222
METHOD AND APPARATUS FOR MIXING AND SPRAYING TWO DIFFERENT LIQUIDS AND MEANS FOR FLUSHING AFTER USE
Robert J. Gelin, Newark, Ohio, assignor to Owens-Corning Fiberglas Corporation, a corporation of Delaware
Filed Dec. 21, 1965, Ser. No. 515,422
8 Claims. (Cl. 239—10)

ABSTRACT OF THE DISCLOSURE

A resin and catalyst system is provided having a unique flushing system and a unique mixing system for the resin and catalyst. In the flushing system, a flushing liquid is supplied to the mixing head and spray gun if this is not done by the operator within a predetermined period of time after the spray gun is shut off. The period of time usually is long enough to span normal delays so that flushing will not occur if spraying is commenced again. In mixing the resin catalyst, a stream of each is subdivided into a plurality of individual streams which are combined, and then subsequently re-combined into a main stream.

---

This invention relates to a spraying system and particularly to a spraying system for spraying resin and a catalyst, which system is capable of maintaining closely-controlled proportions of the resin and the catalyst.

In using resin for laminates or gel coats, for example, very little catalyst is required. The catalyst that is empolyed, however, must be closely proportioned and uniformly mixed with the resin. If there is an insufficient amount, the cure time will be excessive or the resin may not harden at all. On the other hand, if an excessive amount of catalyst is employed, the resin will cure too rapidly and crack or distort during the curing.

Heretofore, in the spraying of resin and catalyst, a pressure pot system has usually been employed. Accordingly, separate containers of the resin and catalyst are maintained under air pressure with the resin and catalyst forced to the spray gun with the quantities controlled by flowmeters. This system has not been as accurate as required, even with frequent calibration. Consequently, more than a minimum amount of catalyst has been employed to ensure sufficiency thereof for all portions of the resin. Because of the inaccuracies in the system, the catalyst is often diluted with a diluent, or an accelerator sometimes is used with part of the resin and the catalyst with another part of the resin. In either situation, the catalyst is used with additional material so that the proportioning ratio employed can be low; hence, even with inaccuracies, the proportioning is held sufficiently close to be satisfactory. For example, a 3:1 ratio will be used when the resin is mixed with the catalyst and diluent or when the resin and accelerator are mixed with the catalyst and other resin. With this ratio, even a variation in the proportioning of five percent or more will not be excessive.

The above system, however, has several disadvantages in addition to the use of an excessive amount of catalyst. With two relatively large proportions of the resin and catalyst employed, they are normally mixed downstream of the nozzle of the spray gun, which frequently produces an inadequate mixture of the materials when they reach the surface to which they are applied. This results in improper curing or a requirement for even more catalyst. Further, where the catalyst is used with part of the resin, a relatively short pot life results so that relatively small quantities of the mixture must be prepared more frequently to be sure they will be used within the proper time.

The present invention relates to a spraying system in which the resin and the catalyst are supplied entirely separately and undiluted to the spray gun through positive displacement pumps driven in synchronism, preferably by a common drive source. The new system enables accurate ratios even in the order of 100:1 to be attained for the resin and the catalyst. Consequently, with these high ratios, it is not necessary to add diluents to the catalyst or to split the resin into separate supplies. Frequent calibration of the proportioning apparatus is no longer required, which further shortens the start-up time for the system. Of course, the cost of the diluent is eliminated and pot life of the materials is greatly lengthened.

In the spraying of resin and catalyst, it is essential that the portion of the system, especially the spray gun, in which the resin and catalyst are in contact with one another be flushed out before hardening can occur. The new spraying system employs an automatic flushing arrangement by means of which flushing liquid or solvent is supplied to the spray system a predetermined period of time after spraying has stopped, unless the system is flushed out by manually-operated controls within the period.

It is, therefore, a principal object of the invention to provide a spraying system for resin and catalyst in which the ratio thereof is more accurately controlled.

Another object of the invention is to provide a spraying system in which resin and undiluted catalyst are maintained separately and mixed together uniformly immediately prior to entering the spray gun.

A further object of the invention is to provide a spraying system having means for being flushed a predetermined period of time after spraying has ceased.

Other objects and advantages of the invention will be apparent from the following detailed description of a preferred embodiment thereof, reference being made to the accompanying drawing, in which:

FIG. 1 is a somewhat diagrammatic view of an overall spraying system in accordance with the invention;

Figure 5:
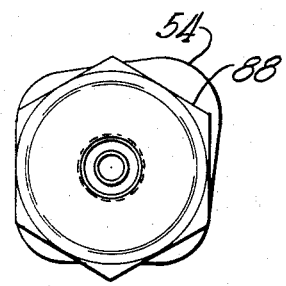
FIG. 5 is a front view of the mixing head.
Figure 4:
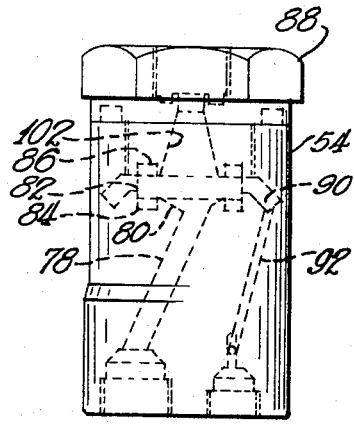
FIG. 4 is a top view of the mixing head.

Referring to FIG. 1, the spraying system in accordance with the invention is shown specifically in connection with an airless, electrostatic spray gun, although the system can be used with equal facility with an air-operated electrostatic spray gun or a conventional airless or air-operated spray gun. A spray gun 10 includes a trigger 12 for opening and closing a valve 14 to enable a nozzle 16 to communicate with a mixing head indicated at 18. The trigger 12 also actuates a switch 20 which connects a power pack represented by a box 22 to an electrode 24 adjacent the nozzle 16 to cause particles sprayed from the nozzle 16 to assume a charge. The switch 20 also operates other controls to be discussed subsequently.

Resin for the spray gun 10 is maintained under pressure in a container 26 in a pressure vessel 28. Air is supplied to the vessel 28 through a pressure regulator 30 and a line 32 from a suitable source 34, such as a compressor. The resin then is directed through a line 36 to a pair of positive displacement pumps 38 which have suitable safety provisions for limiting maximum pressure. The resin is supplied to the mixing head from the pumps 38 through a supply line 40. The pumps 38 are single-acting so that two pumps are employed with pulses alternating to prevent excessive pulsation. Pumps suitable for this purpose can be obtained from the Lapp Process Equipment Division of the Lapp Insulator Company, Inc., Leroy, New York. These pumps provide an exact output and enable the output to be closely controlled by simple adjustment of the piston stroke length.

Catalyst for the spray gun can be supplied from a small container 42 by gravity through a line 44 to additional positive displacement pumps 46, which preferably are of the same type as the pumps 38 but of much smaller size and capacity. The catalyst is directed to the mixing head 18 through a line 48. The relatively small quantity of the catalyst eliminates the necessity of pressure feed, although such can be used if desired.

The two pairs of pumps 38 and 46 must be driven at exactly the same speed for accuracy. A preferred way of accomplishing this is to connect the four pumps through common drive shafts to a gear reducer 50 which is driven by a single motor 52. In this manner, synchronization of the pumps is assured and high ratios of the resin and catalyst, in the order of 100:1, are attained and maintained without requiring frequent calibration.

Because of the high ratio and the very small quantity of catalyst used with the resin, thorough and uniform mixing of the two are essential. Such mixing is achieved with the mixing or dispensing head 18, which is shown in more detail in FIGS. 2–5. The head 18 also has other applications, as for dispensing metered liquids to matched dies, for example. The mixing head 18 includes a mixing body 54 which has four threaded recesses at one end to receive four fittings 56–62 having check valves 64–70. The check valves enable flow into the body but not in the opposite direction.

The fitting 56 is connected to the supply line 40 for the resin. The fitting 58 is connected to the supply line 48 for the catalyst. The fitting 60 is connected to a first flushing line 72 which communicates with a first flushing pump 74 while the fourth fitting 62 communicates with a second flushing line 76 which communicates with a second flushing pump 77. The controls for flushing the system with flushing liquid will be discussed subsequently.

The resin fitting 56 communicates with a resin passage 78 which terminates in a central inlet chamber 80 in the body 54. A mixing disc or member 82 defines the front of the chamber 80 with the disc 82 supported in the body 54 between gaskets 84 and 86 and held by a retainer nut 88. An annular inlet chamber 90 surrounds the disc 82 and receives catalyst from the catalyst fitting 58 through a catalyst passage 92.

Figures 6, 7:
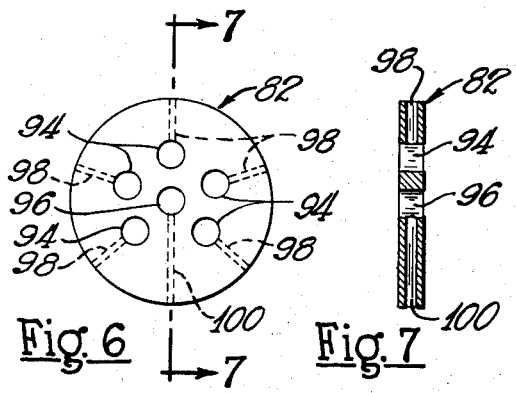
FIG. 6 is a front view of a mixing disc employed in the mixing head.
FIG. 7 is a view in cross section taken along the line 7—7 of FIG. 6.
Figure 2:
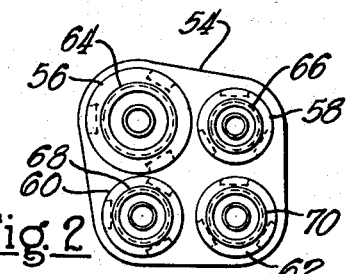
FIG. 2 is a rear view of a mixing head used in the spray system.
Figure 3:
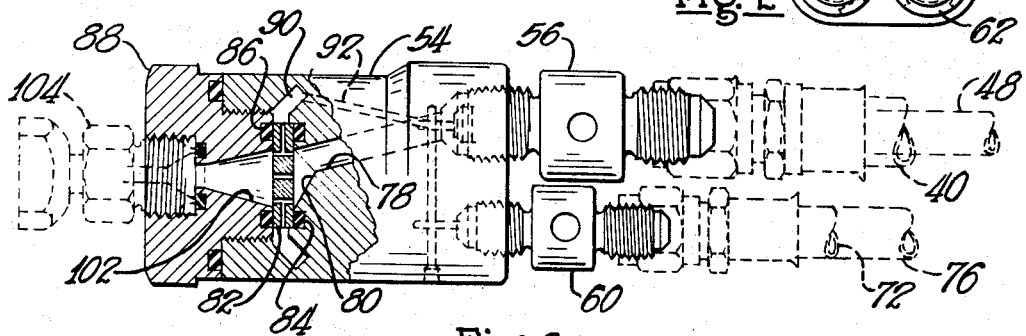
FIG. 3 is a side view in elevation of the mixing head, with parts broken away and with parts in section.

Referring more particularly to FIGS. 5 and 6, the mixing disc 82 includes, in this instance, several uniformly spaced outer passages 94 positioned on a common circle and a central passage 96. Each of the passages 94 and 96 is intersected at an intermediate point by radially-extending passages 98 and 100 which terminate at the edge of the mixing disc 82 and communicate with the annular chamber 90. Consequently, each of the resin passages 94 and 96 receives its own stream of catalyst through the passages 98 and 100.

The mixing disc 82 thereby achieves uniform mixing of the resin and catalyst with further mixing occurring in a central outlet chamber 102 connected to an outlet fitting 104 for the spray gun passage. The chamber 102 narrows in cross section from the mixing disc 82 toward the fitting 104 to further enhance mixing of the resin and catalyst prior to being supplied to the spray gun. In spite of the high ratio of resin to catalyst supplied to the spray gun, the plurality of individual mixing passages for the resin and the catalyst enables proper uniform mixing to be attained. In the event that additional mixing is desired, a spiral mixing vane can be located in the passage between the mixing head and the spray gun.

It is important that those portions of the spraying system which contain both catalyst and resin be thoroughly flushed when spraying is stopped. If the resin should harden, the time and expense involved in cleaning the system and opening the passages is tremendous. Also, if the flushing is not thorough, it is possible for hardened resin to build up in corners or certain passages of the system and eventually cause a blockage. If but a single pump and line is used to flush both the resin passages and the catalyst passages of the mixing head 18, as well as the spray gun passage and nozzle, it is possible for such build-up and blockage to occur in one passage or the other. However, with the separate flushing lines and separate pumps, full and thorough cleaning is achieved. The pumps 74 and 78 can be supplied from a single source of flushing liquid shown as a pressure tank 106 communicating with the pumps 74 and 78 through a supply line 108 and connected with a source 110 of air through a regulator 112 and a line 114.

After spraying has terminated, a manually-operated flush switch 116 is closed to energize solenoid-operated valves 118 and 120 in the flush lines 72 and 76. At the same time, a motor 122 for the pumps 74 and 77 is energized to supply flushing liquid to the mixing head 18 and the spray gun.

At the time the spray gun trigger 12 is released, an interval timer 124 is caused to begin to time out for a predetermined period. If during this period, the manual switch 116 is closed to flush the system, the timer 124 is reset by virtue of a pressure switch 126 located in either of the flush lines. The timer 124 will then not begin to time out again until the spray gun trigger is subsequently pulled and released again. However, if the manual switch 116 is not closed in the predetermined period so that the pressure switch is not energized by fluid in the flushing lines, the timer 124 energizes a time delay relay 128 which then closes contacts 128–1 in series with a duration timer 130 which closes contacts and supplies current to the flush valves and motor for a predetermined period of time.

By way of further example, the interval timer 124 can be designed to energize the duration timer 130 in a range from two minutes to ten minutes and preferably from about four minutes to six minutes after the spraying is terminated and the trigger 12 is released. The duration timer 130 is eneregize for a predetermined period, from thirty seconds to one-and-one-half minutes, for example, to assume thorough cleaning of the mixing head and spray gun. While a number of suitable timers can be used, both timers are commercially available from Automatic Timing & Controls, Inc. located at King of Prussia, Pa. The timer 124 can be a Model 305–B15–A–01–Ex with knob lock 30526348 and the timer 130 can be a Model 305–B–07–A–01–Ex with the same knob lock. The above controls also can include suitable interlocking switches to prevent flushing while spraying is taking place and vice versa, for example. When air-atomization is employed, the motor for the resin and catalyst can be energized by a pressure switch in the air line.

Numerous other modifications of the invention will be apparent to those skilled in the art, and it is to be understood that such modifications can be made without departing from the scope of the invention, if they are within the spirit and the tenor of the accompanying claims.

I claim:

1. A method for intimately combining a portion of a first liquid and a portion of a second liquid, said method comprising establishing a source of said first liquid, flowing said first liquid along a predetermined path and dividing said first liquid into a plurality of separate streams, establishing a source of the second liquid, flowing the second liquid along a predetermined path and dividing the second liquid into a plurality of separate streams, combining each of the separate streams of the second liquid directly with one of the separate streams of the first liquid, subsequently re-combining the resulting separate streams of the combined first and second liquids, and directing the combined streams in a predetermined direction.

2. A method of intmiately combining a resin and a catalyst, said method comprising establishing a fixed metered quantity of resin and directed the quantity along a predetermined path, simultaneously established a fixed, metered, much smaller quantity of catalyst and directing the second quantity along a second predetermined path, dividing said first quantity into a plurality of separate streams, dividing the second quantity into a plurality of separate streams, combining each of the separate streams of the second quantity with one of the separate streams of the first quantity, and subsequently re-combining all of the resulting separate streams of the first and second quantities.

3. A spray system for spraying catalyzed resin, said system including a spray gun, a mixing head communicating with said spray gun, a first pump, a source of resin, means for supplying resin from said source to said pump, means for supplying resin from said pump to said mixing head, a second pump, a source of catalyst, means for supplying catalyst from said catalyst source to said second pump, mean for supplying catalyst from said second pump to said mixing head, said mixing head having means for mixing together resin and catalyst, drive means for driving said first and second pumps together, means for supplying flushing liquid to said mixing head after the spray from the spray gun is shut off, said flushing liquid supplying means including a source of flushing liquid, a third pump, means connecting said third pump and said liquid source, means connecting said third pump and the resin-receiving portion of said mixing head, a fourth pump, means connecting said fourth pump and said liquid source, and means connecting said fourth pump and the catalyst-receiving portion of said mixing head.

4. A spray system for spraying catalyzed resin, said system including a spray gun, a mixing head communicating with said spray gun, a first pump, a source of resin, means for supplying resin from said source to said pump, means for supplying resin from said pump to said mixing head, a second pump, a source of catalyst, means for supplying catalyst from said catalyst source to said second pump, means for supplying catalyst from said second pump to said mixing head, said mixing head having means for mixing together resin and catalyst, drive means for driving said first and second pumps together, means for supplying flushing liquid to said mixing head after the spray from the spray gun is shut off, said flushing liquid supply means including a source of flushing liquid, additional pump means, means connecting said pump means and said liquid source, means connecting said pump means and said mixing head, timing means energized when the spray gun is shut off for producing a signal effective to aid in the initiation of flushing of said mixing head after a predetermined period of time elapses, the period beginning when said spray gun is shut off, manually-operable means for causing flushing liquid to be supplied to said mixing head from said additional pump means, and means responsive to said manually-operable means for rendering said timing means ineffective when said manually-operable means is operated within said predetermined period of time.

5. A spray system for spraying a catalyzed resin, said system including a spray gun, a mixing head communicating with said spray gun, a first pump, a source of resin, means for supplying resin from said source to said pump, means for supplying resin from said pump to said mixing head, a second pump, a source of catalyst, means for supplying catalyst from said catalyst source to said second pump, means for supplying catalyst from said second pump to said mixing head, said mixing head having means for mixing together resin and catalyst, drive means for driving said first and second pumps together, said mixing head having a first inlet for receiving resin from said resin supply means, a second inlet for receiving catalyst from said catalyst supply means, a central chamber, passage means connecting said first inlet and said central chamber, a mixing member at the front of said central chamber, an outlet chamber on the side of said member opposite said central chamber, outlet means communicating with said outlet chamber, said mixing member having passages connected with said central chamber and said outlet chamber for supplying resin from said central chamber to said outlet chamber, said mixing member having additional passages for supplying catalyst to said resin passages, and passage means connecting said second inlet and said additional passages of said mixing member.

6. A spray system according to claim 5 characterized by said additional passages terminating at the outer edges of said mixing member, and said passage means including a chamber in said mixing head disposed around said mixing member and communicating with said additional passages.

7. A mixing head for intimately combining a large portion of a first fluid and a small portion of a second fluid, said mixing head having a first inlet for receiving first fluid from a first fluid supply means, a second inlet for receiving second fluid from a second fluid supply means, a central chamber, passage means connecting said first inlet and said central chamber, a mixing member communicating with said central chamber, an outlet chamber on the side of said member opposite said central chamber, outlet means communicating with said outlet chamber, said mixing member having passages connecting said central chamber and said outlet chamber, said mixing member having an additional passage communicating directly with each of said first passages for supplying second fluid to said first fluid passages, and passage means connecting said second inlet and said additional passages of said mixing member.

8. A mixing head according to claim 7 characterized by said additional passages terminating at the outer edges of said mixing member, and said passage means including a chamber disposed around said mixing member and communicating with said additional passages.

References Cited

UNITED STATES PATENTS

| 1,578,101 | 3/1926 | Stacey | 239—434 |
| 1,785,802 | 12/1930 | Adams | 239—434 |
| 3,079,090 | 2/1963 | Decker | 239—414 X |
| 3,083,913 | 4/1963 | Coffman et al. | 239—142 X |
| 3,122,322 | 2/1964 | Niemann et al. | 239—142 X |

M. HENSON WOOD, JR., *Primary Examiner.*

H. NATTER, *Assistant Examiner.*